July 29, 1930.  A. Y. DODGE  1,771,843
BRAKE MECHANISM
Filed Aug. 24, 1925  2 Sheets-Sheet 2
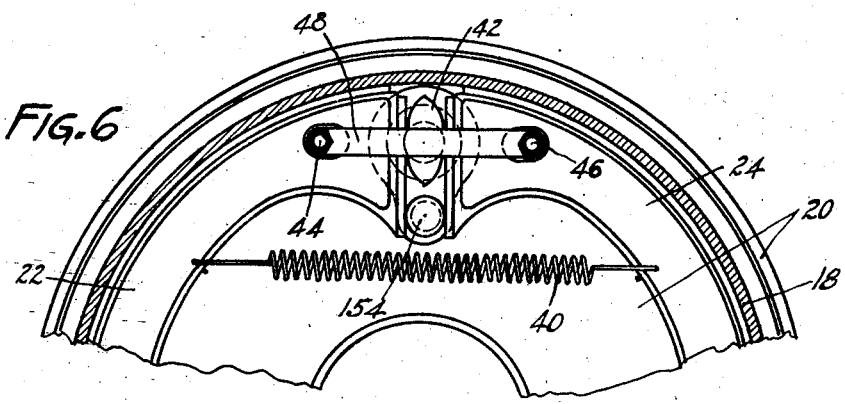
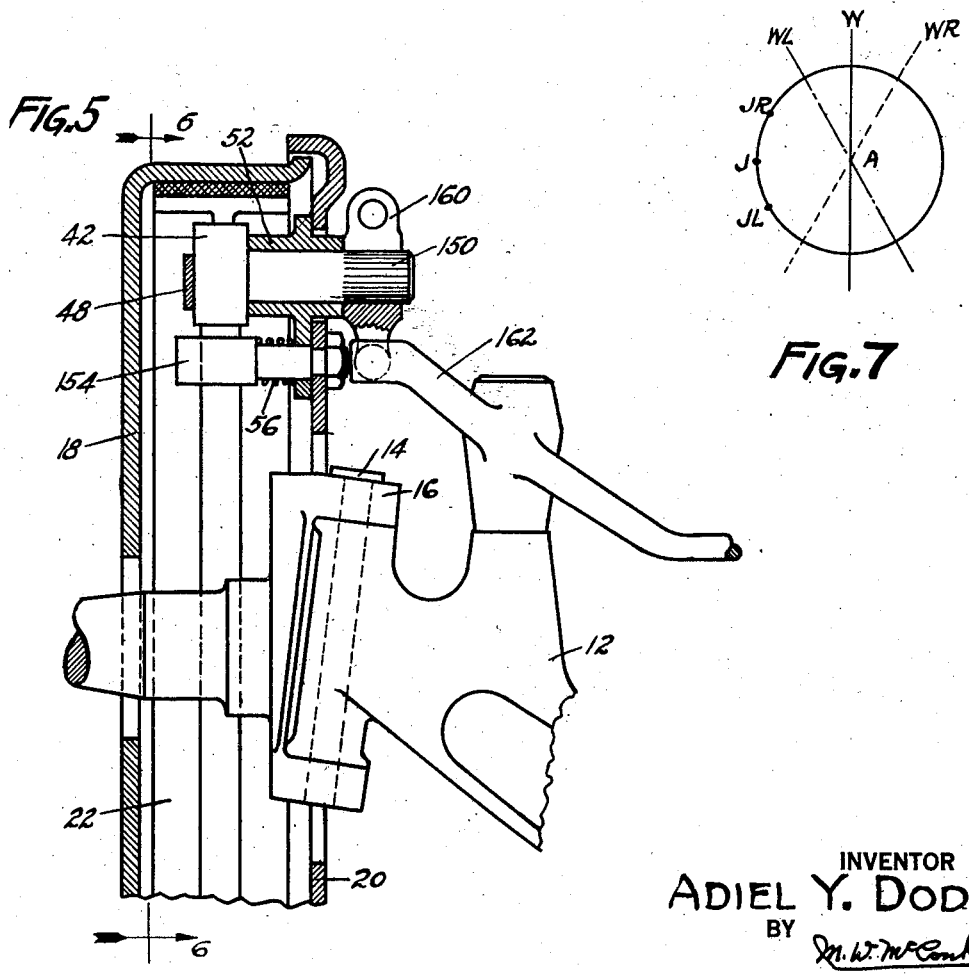
INVENTOR
ADIEL Y. DODGE
BY
ATTORNEY Patented July 29, 1930

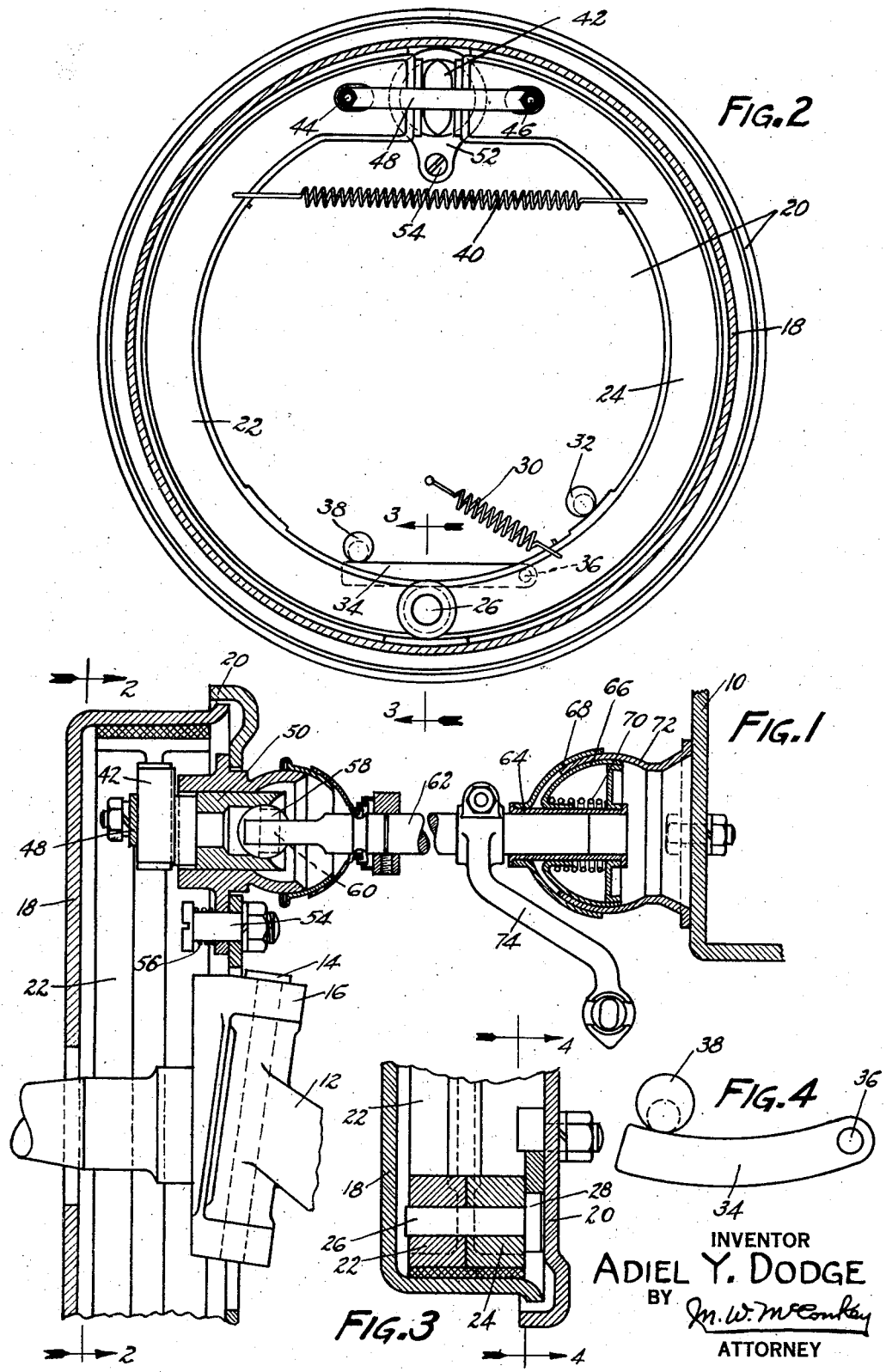

1,771,843

UNITED STATES PATENT OFFICE

ADIEL Y. DODGE, OF SOUTH BEND, INDIANA, ASSIGNOR TO BENDIX BRAKE COMPANY, OF CHICAGO, ILLINOIS, A CORPORATION OF ILLINOIS

BRAKE MECHANISM

Application filed August 24, 1925. Serial No. 51,937.

This invention relates to brakes, and is illustrated as embodied in an automobile front wheel brake. An object of the invention is to provide a simple self-centering means for the brake cam, or its equivalent, by the use of a novel movable supporting bracket therefor. While useful also with other brakes, this is especially advantageous in operating a brake of the "double-wrapping" or "due-servo" type, which anchors at one end when the drum is turning in one direction and at the other end when the drum is turning in the opposite direction.

When used with a front or other swivelled wheel, the brake-applying means is preferably operated through a universal joint which permits the described movement of the bracket, and which may, if desired, be so constructed and so arranged with respect to the swivelling axis of the wheel as to vary the pressure on the brake when the wheel is swivelled, e. g. to relieve the brake on the outside of the turn.

In one desirable arrangement, the universal joint is operated by a chassis-supported shaft of the Perrot type. In another arrangement, the cam or its equivalent is arranged to pivot about a neutral axis, and is operated by an arm or the like having a part which is in the neutral axis when the brake is applied, so that the centering movement does not affect the application of the brake.

When this second modification is used with a brake for a swivelled wheel, I prefer to arrange the connections so that the pivoted brake-applying means includes a joint which at least when the brake is applied is substantially at the intersection of the swivelling axis of the wheel and the neutral axis about which the brake-applying means pivot. Preferably said means includes a part, such as one member of the joint, movable in applying the brake from an idle position spaced from the swivelling axis of the wheel to an active position substantially in that axis and also in the neutral axis.

Other objects and features of the invention, including a novel positioning stop for the friction device, and other novel combinations of parts and desirable particular constructions, will be apparent from the following description of the illustrative embodiments shown in the accompanying drawings, in which:

Fig. 1 is a partial vertical section through a front brake with a Perrot type control;

Fig. 2 is a vertical section on the line 2—2 of Fig. 1, showing the shoes in side elevation;

Fig. 3 is a partial vertical section on the line 3—3 of Fig. 2, showing the stop;

Fig. 4 is a view of a modified form of stop lever, the view being substantially corresponding to a partial section on the line 4—4 of Fig. 3;

Fig. 5 is a view corresponding to Fig. 1, but showing a crank-and-lever control;

Fig. 6 is a partial vertical section on the line 6—6 of Fig. 5, showing the tops of the shoes in side elevation; and Fig. 7 is a diagram, corresponding to a top plan view, and illustrating the variation in pressure when the wheel is swivelled.

In the arrangement of Figs. 1-3, a chassis frame 10 is supported by the usual springs (not shown) on a front axle 12 and a rear axle (not shown). At each end of the front axle 12 is swivelled by means such as a kingpin 14 a knuckle 16 rotatably supporting a wheel having a brake drum 18. The knuckle also carries a backing plate or support 20 at the open side of the drum.

Between drum 18 and plate 20 are arranged a plurality of floating "double-wrapping" or "duo-servo" interchangeable brake shoes 22 and 24, overlapping at their ends and connected by a pivot 26 having a head 28 slidably engaging plate 20.

In order to determine the idle positions of the shoes, shoe 24 is held by a spring 30 against an eccentric adjustable stop 32 carried by plate 20. Spring 30 also holds the head 28 of pivot 26 slidably against a stop or lever 34 pivoted at 36 at one end and adjusted at its other end by means of another adjustable eccentric 38. Lever 34 may be straight, as in Fig. 2, or curved substantially about the axis of the drum, as in Fig. 4. The above-described positioning means is not claimed herein, the same forming a subject-matter of my divisional application No. 377,393, filed July 11, 1929.

Shoes 22 and 24 are forced apart, in applying the brake, against the resistance of a return spring 40 by means shown as a double cam 42. The shoes and pivot 26 constitute a floating friction unit, shoe 22 anchoring on a fixed post 44 when the drum is turning clockwise (Fig. 2), and shoe 24 anchoring on a fixed post 46 when the drum is turning counter-clockwise. The shoes have lost-motion slots embracing the posts, to permit of the described operation, and the posts may carry a plate 48 bridging the ends of the shoes and positioning them laterally.

Cam 42 is carried by a shaft 50 journalled in a movable bracket 52 pivoted by a bolt 54 to permit the cam to center itself as the shoes shift in one direction or the other. A spring 56 is compressed by the bolt 54 so that it urges bracket 50 and support 20 together, lightly resisting the swinging of the bracket and preventing rattle of the parts.

Shaft 50 has in its end a cylindrical cross bore for a pair of connecting members 58, between which a pin 60 pivots the flattened end of an operating shaft 62. This forms a universal joint permitting the above-described swinging of bracket 52. The joint is substantially in the swivelling axis, i. e. the axis of king-pin 14, and its vertical axis (the axis of pin 60) crosses the swivelling axis of the wheel at an acute angle. As is well known, unless the two front brakes are equalized, this arrangement will cause variation in the braking pressure when the wheel is swivelled, in such a manner as to relieve the pressure on the brake on the outside of the turn.

The inner end of shaft 62 is slidably supported by a sleeve 64 carried by two semi-spherical stampings 66 and 68 held by a spring 70 yieldingly against the inside and outside of a semi-spherical shell 72 carried by frame 10. The shaft is rocked to apply the brake by an arm 74.

The arrangement of Figs. 5-7 differs somewhat from that described above. The slots in shoes 22 and 24 are long enough so that they do not anchor against posts 46 and 48, but against an extension of pivot 154, corresponding to pivot 54. Pivot 154 is shouldered so that it can be clamped tightly to support 20, the spring 56 as before holding bracket 52 and support 20 together.

Shaft 150, corresponding to shaft 50, carries adjustably clamped on its end a lever or arm 160 having a ball end universally engaged by a vertical plane surface on the end of a lever 162 fulcrumed on axle 12. Lever 162 is generally horizontal,—i. e. it rocks about a generally vertical axis,—and the joint between the two levers is moved in applying the brake from an idle position spaced from the swivelling axis of the wheel, and from the neutral axis about which cam 42 swings, to an active position substantially at the intersection of the two axes.

If it is desired that the outer brake shall be relieved on a turn, the two front brakes are not equalized, and the joint between the two levers is in active position a fraction of an inch outside the swivelling axis.

In Fig. 7, W is a line through the swivelling axis A which is parallel to the wheel when running straight ahead. When the wheel is swivelled to the right it assumes some position parallel to a line WR, and when swivelled to the left it is parallel to WL.

The joint between levers 160 and 162, with the brake applied and the vehicle running straight ahead, is shown at J. When the wheel is swivelled to the right, which places it on the outside of the turn, the joint tends to move to JR, lever 160 moving away from lever 162 to relieve the pressure on the brake. When the wheel is swivelled to the left, the joint tends to move to JL, and lever 160 crowds against lever 162 to increase the pressure on the brake.

While illustrative embodiments have been described in detail, it is not my intention to limit the scope of the invention to those particular embodiments, or otherwise than by the terms of the appended claims.

I claim:

1. A vehicle having a swivelled wheel with a brake drum, and comprising, in combination therewith, a friction device swivelling with the wheel and shiftable slightly with the drum when applied to anchor at one end when the drum is turning in one direction and at the other end when the drum is turning in the opposite direction, a brake-applying device swinging with the friction device in an arc about a neutral axis crossing the swivelling axis and having a part movable in applying the brake from an idle position spaced from the swivelling axis to an active position substantially in both the neutral axis and the swivelling axis but so arranged with respect to the swivelling axis as to vary the pressure on the brake when the wheel is swivelled, and means engaging said part to apply the brake.

2. A vehicle having a swivelled wheel with a brake drum, and comprising, in combination therewith, a friction device swivelling with the wheel, a brake-applying device swinging in an arc about a neutral axis crossing the swivelling axis and having a part movable in applying the brake from an idle position spaced from the swivelling axis to an active position substantially in both the neutral axis and the swivelling axis but so arranged with respect to the swivelling axis as to vary the pressure on the brake when the wheel is swivelled, and means engaging said part to apply the brake.

3. A vehicle having a swivelled wheel with a brake, and comprising, in combination therewith, a brake-applying device swinging in an arc about a neutral axis and having a part movable in applying the brake from an idle position spaced from the swivelling axis to an active position substantially in both the neutral axis and the swivelling axis but so arranged with respect to the swivelling axis as to vary the pressure on the brake when the wheel is swivelled, and means engaging said part to apply the brake.

4. A vehicle having a swivelled wheel with a brake, and comprising, in combination therewith, a brake-applying device swinging in an arc about a neutral axis and having a part movable in applying the brake from an idle position spaced from the swivelling axis to an active position substantially in both the neutral axis and the swivelling axis, and means engaging said part to apply the brake.

5. A vehicle having a swivelled wheel with a brake, and comprising, in combination therewith, a brake-applying device swinging in an arc about a neutral axis and having a part movable in applying the brake from an idle position spaced from the swivelling axis to an active position substantially in both the neutral axis and the swivelling axis but so arranged with respect to the swivelling axis as to vary the pressure on the brake when the wheel is swivelled, and a pivoted non-swivelling lever engaging said part and operable to apply the brake.

6. A vehicle having a swivelled wheel with a brake, and comprising, in combination therewith, a brake-applying device swinging in an arc about a neutral axis and having a part movable in applying the brake from an idle position spaced from the swivelling axis to an active position substantially in both the neutral axis and the swivelling axis, and a pivoted non-swivelling lever engaging said part and operable to apply the brake.

7. A vehicle having a swivelled wheel with a brake, and comprising, in combination therewith, a brake-applying device swinging in an arc about a neutral axis and having a part movable in applying the brake from an idle position spaced from the swivelling axis to an active position substantially in both the neutral axis and the swivelling axis, and a pivoted generally horizontal lever engaging said part and operable to apply the brake.

8. A vehicle having a swivelled wheel with a brake drum, and comprising, in combination therewith, a friction device swivelling with the wheel and shiftable slightly with the drum when applied to anchor at one end when the drum is turning in one direction and at the other end when the drum is turning in the other direction, a brake-applying device swinging with the friction device in an arc about a neutral axis, and brake-applying means including a joint arranged at least when the brake is applied substantially at the intersection of the neutral axis and the swivelling axis and so constructed and so arranged as to vary the pressure on the brake when the wheel is swivelled.

9. A vehicle having a swivelled wheel with a brake, and comprising, in combination therewith, a brake-applying device swinging in an arc about a neutral axis, and brake-applying means including a joint arranged at least when the brake is applied substantially at the intersection of the neutral axis and the swivelling axis and so constructed and so arranged as to vary the pressure on the brake when the wheel is swivelled.

10. A vehicle having a swivelled wheel with a brake drum, and comprising, in combination therewith, a friction device swivelling with the wheel and shiftable slightly with the drum when applied to anchor at one end when the drum is turning in one direction and at the other end when the drum is turning in the other direction, a brake-applying device swinging with the friction device in an arc about a neutral axis, and brake-applying means including a joint arranged at least when the brake is applied substantially at the intersection of the neutral axis and the swivelling axis.

11. A vehicle having a swivelled wheel with a brake, and comprising, in combination therewith, a brake-applying device swinging in an arc about a neutral axis, and brake-applying means including a joint arranged at least when the brake is applied substantially at the intersection of the neutral axis and the swivelling axis.

12. A vehicle having a swivelled wheel with a brake, and comprising, in combination therewith, a brake-applying device swinging in an arc about a neutral axis, and brake-applying means for operating said device having a universal joint substantially in the swivelling axis and in the neutral axis at least when the brake is applied.

13. A vehicle having a swivelled wheel with a brake, and comprising, in combination therewith, a brake-applying device swinging in an arc about a neutral axis, and brake-applying means for operating said device having a universal joint substantially in the swivelling axis at least when the brake is applied.

14. A vehicle having a swivelled wheel with a brake, and comprising, in combination therewith, a brake-applying device swinging in an arc about a neutral axis, and brake-applying means for operating said device having a universal joint substantially in the swivelling axis at least when the brake is applied, the joint being so constructed and so arranged with respect to the swivelling axis as to vary the pressure on the brake when the wheel is swivelled.

15. A vehicle having a swivelled wheel with a brake, and comprising, in combination therewith, a brake-applying cam supported for swinging movement in an arc about a neutral axis, and means for rocking the cam having a joint substantially at the intersection of the swivelling axis and the neutral axis, at least when the brake is applied.

16. A vehicle having a swivelled wheel with a brake, and comprising, in combination therewith, a brake-applying cam and a camshaft supported for swinging movement in an arc about a neutral axis, and means for rocking the cam shaft having a joint substantially in the swivelling axis, at least when the brake is applied, and which is arranged to permit the cam to swing about the neutral axis.

17. A vehicle having a swivelled wheel with a brake, and comprising, in combination therewith, a movable bracket swivelling with the wheel, a cam and its shaft carried by the bracket, movement of the bracket permitting the cam to center itself, a fixed support adjacent the bracket, a spring urging the bracket and support together and lightly resisting movement of the bracket, and brake-applying means for rocking the shaft including a universal joint arranged, when the brake is on, substantially in the swivelling axis.

18. A vehicle having a wheel with a brake, and comprising, in combination therewith, a movable bracket, a cam and its shaft carried by the bracket, movement of the bracket permitting the cam to center itself, a fixed support adjacent the bracket, a spring urging the bracket and support together and lightly resisting movement of the bracket, and brake-applying means for rocking the shaft including a universal joint permitting movement of the bracket.

19. A vehicle having a wheel with a brake, and comprising, in combination therewith, a pivoted bracket, a brake-applying shaft journalled in the bracket, a brake-applying cam on the shaft, and a spring lightly resisting pivotal movement of the bracket.

20. A brake comprising, in combination, a drum, a friction device engageable with the drum and shiftable to anchor at either end according to the direction of rotation of the drum, a movable bracket adjacent the ends of the friction device, a spring resistant movement of the bracket, a shaft journalled in the bracket, and a cam on the shaft between the ends of the friction device, the bracket and shaft and cam floating as a unit to permit the cam to center itself when the friction device shifts.

21. A brake comprising, in combination, a drum, a friction device, a pivoted bracket, a shaft journalled in the bracket, means operated by the shaft for forcing the friction device against the drum, the bracket and shaft and said means swinging pivotally as a unit to cause said means to center itself, and a spring resisting swinging of the bracket.

22. A brake comprising, in combination, retarding means, a bracket swinging about a neutral axis, and brake-applying means carried by the bracket and including a joint moved in applying the brake from an idle position spaced from the neutral axis to an active position substantially in that axis.

23. A brake comprising, in combination, retarding means, a bracket swinging about a neutral axis, a brake-applying cam and camshaft carried by the bracket, an arm on the shaft having a part moved in applying the brake from an idle position spaced from the neutral axis to an active position substantially in that axis, and brake-applying means engaging said part of the arm.

24. A vehicle having a swivelled wheel with a brake, and comprising, in combination therewith, a bracket swinging about a neutral axis, brake-applying means including a part movable in applying the brake from an idle position spaced from the neutral axis and from the swivelling axis of the wheel to an active position substantially in both axes, and means engaging said part and operable to apply the brake.

25. A vehicle having a swivelled wheel with a brake, and comprising, in combination therewith, a brake-applying device swinging about a neutral axis, an arm for operating said device having a part movable in applying the brake from an idle position spaced from the neutral axis and from the swivelling axis of the wheel to an active position substantially in both axes, and means engaging said part of the arm and operable to apply the brake.

26. A vehicle having a swivelled wheel with a brake, and comprising, in combination therewith, a bracket swinging about a neutral axis, brake-applying means including a part movable in applying the brake from an idle position spaced from the neutral axis and from the swivelling axis of the wheel to an active position substantially in both axes, and a pivoted lever engaging said part and operable to applying the brake.

27. A vehicle having a swivelled wheel with a brake, and comprising, in combination therewith, a brake-applying device swinging about a neutral axis, an arm for operating said device having a part movable in applying the brake from an idle position spaced from the neutral axis and from the swivelling axis of the wheel to an active position substantially in both axes, and a pivoted lever engaging said part of the arm and operable to apply the brake.

28. A vehicle having a swivelled wheel with a brake, and comprising, in combination therewith, a brake-applying device arranged to swing about a neutral axis and including a part movable in applying the brake from an idle position spaced from the neutral axis and from the swivelling axis of the wheel to an active position substantially in the neutral axis and slightly at one side of the swivelling axis, so that swivelling the wheel changes the pressure on the brake, and means engaging said part and operable to apply the brake.

29. A vehicle having a swivelled wheel with a brake, and comprising, in combination therewith, a brake-applying device arranged to swing about a neutral axis and including an arm having a part movable in applying the brake from an idle position spaced from the neutral axis and from the swivelling axis of the wheel to an active position substantially in the neutral axis and slightly outside of the swivelling axis, so that swivelling the wheel changes the pressure on the brake, and a pivoted lever engaging said part of the arm and operable to apply the brake.

In testimony whereof I have hereunto signed my name.

ADIEL Y. DODGE.